United States Patent [19]

Stephens

[11] 4,426,784
[45] * Jan. 24, 1984

[54] MULTI-MEDIUM THREE-DIMENSIONAL DRAWING TOOL

[76] Inventor: Peter H. Stephens, 636 Stanyan St., San Francisco, Calif. 94117

[*] Notice: The portion of the term of this patent subsequent to Aug. 10, 1999 has been disclaimed.

[21] Appl. No.: 397,088

[22] Filed: Jul. 12, 1982

Related U.S. Application Data

[63] Continuation-in-part of Ser. No. 245,306, Mar. 19, 1981, Pat. No. 4,343,091.

[51] Int. Cl.³ ............................................. B43L 13/00
[52] U.S. Cl. .................................................. 33/18 R
[58] Field of Search .................... 33/18 R, 23 C, 23 F, 33/23 R

[56] References Cited

U.S. PATENT DOCUMENTS 4,135,303  1/1979  Gresset .......................... 33/18 R
4,343,091  8/1982  Stephens ........................ 33/18 R

*Primary Examiner*—Charles E. Phillips
*Attorney, Agent, or Firm*—Phillips, Moore, Lempio & Finley

[57] ABSTRACT

A drawing tool comprises a pair of light transmitting screens, a ground beneath each screen, and a former or tip under each screen adapted to either add material to the ground or subtract material from the ground to create a design thereon. The designs are viewed as a composite three-dimensional image and can be permanently fixed on a removable plate.

12 Claims, 19 Drawing Figures

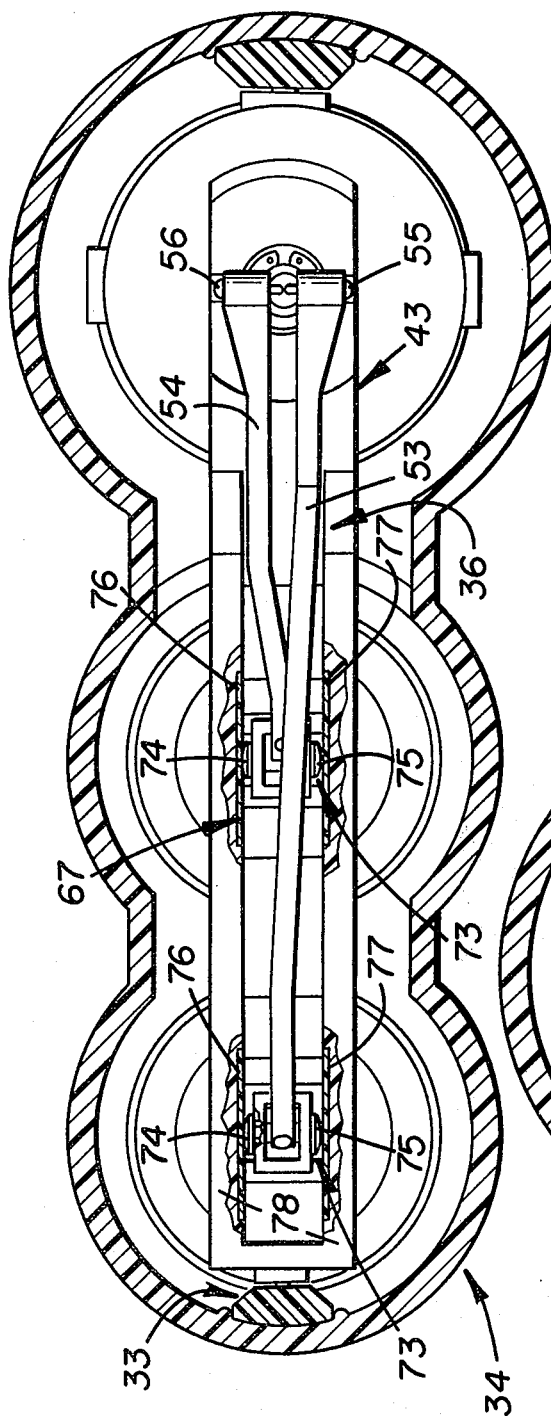
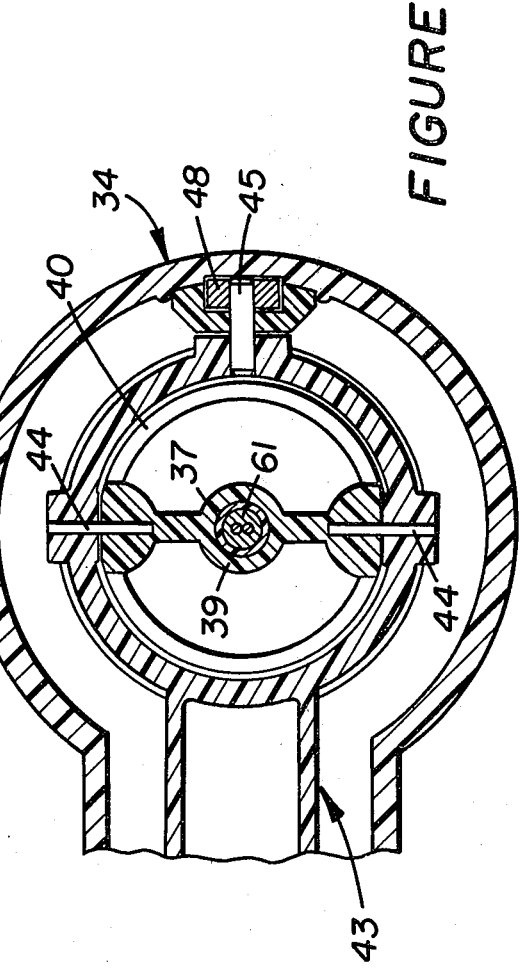
FIGURE 3
FIGURE 4

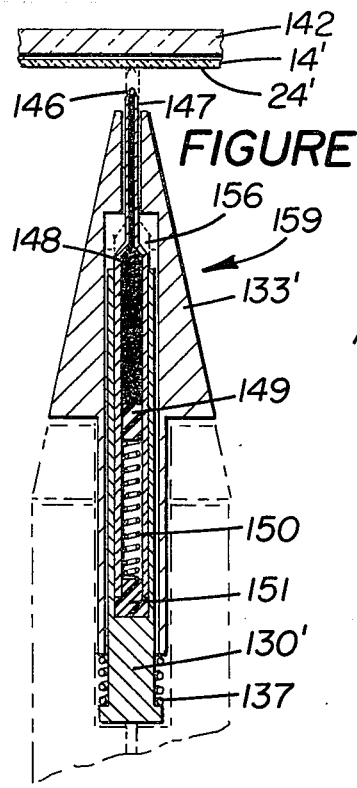
FIGURE 14
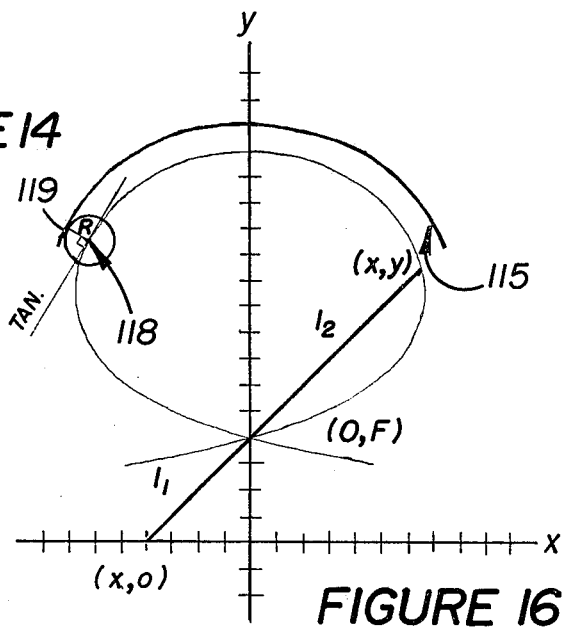
FIGURE 16
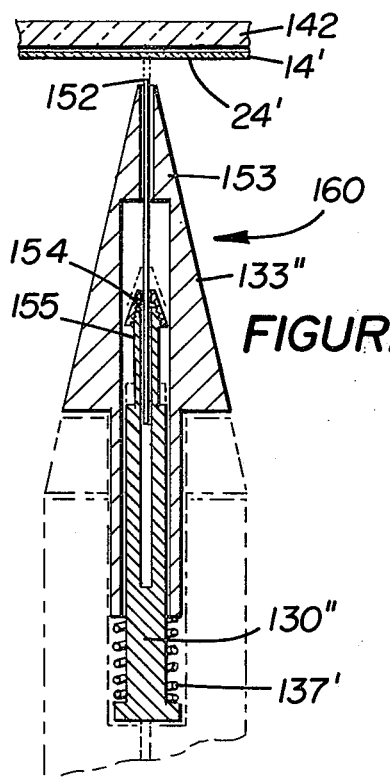
FIGURE 15
FIGURE 17
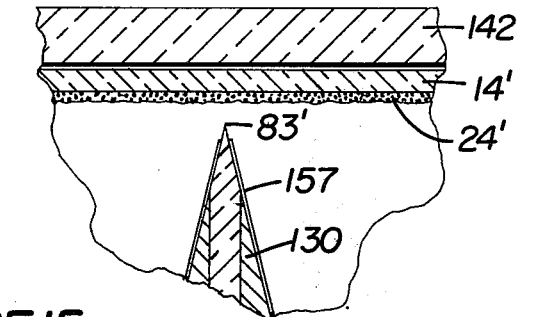
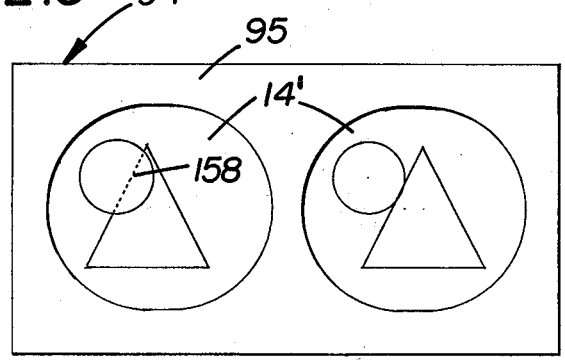
FIGURE 18

MULTI-MEDIUM THREE-DIMENSIONAL DRAWING TOOL

CROSS-REFERENCE TO RELATED APPLICATION

This application is a continuation-in-part of applicant's U.S. patent application Ser. No. 245,306, filed on Mar. 19, 1981, for THREE-DIMENSIONAL DRAWING TOOL, and now U.S. Pat. No. 4,343,091.

TECHNICAL FIELD

This invention is directed to the type of three-dimensional drawing tool concept disclosed in applicant's above-referenced application. In the second embodiment described herein, three-dimensional images are drawn and viewed in their composite during their creation in the drawing tool by selected use of various types of grounds and compatible drawing tips, preferably adapted to form permanent pairs of two-dimensional designs which can be later viewed as composite three-dimensional images in the drawing tool or in any suitable stereoscopic viewing device.

BACKGROUND ART

As discussed in applicant's above-referenced application, the advent of three-dimensional imaging in the mass visual media has dictated the need for a three-dimensional drawing tool. Applicant has discovered that his pioneer drawing tool concept has broad application to a drawing exercise wherein material is added to a ground, subtracted from a ground, or both added and subtracted.

In addition, the concept can be adapted to create permanent pairs of two-dimensional designs (stereograms) that are originally viewed as three-dimensional images during their creation and retain such capability for subsequent use. Applicant has further added various impovements and/or optional features to his drawing tool, fully discussed in detail hereinafter.

DISCLOSURE OF THE INVENTION

An object of this invention is to provide a three-dimensional drawing tool, generally of the type disclosed in applicant's above-referenced application, but one that substantially broadens-out the use and application of the drawing tool. For example, the drawing tool described herein is adapted to add drawing material to a ground or subtract material from a ground, preferably to create permanent pairs of two-dimensional designs that can be later viewed three-dimensionally in the drawing tool or in any other suitable stereoscopic viewing device.

In its broadest aspects, applicant's three-dimensional drawing tool comprises a housing having first and second light transmitting screens mounted thereon, ground means for forming a design beneath each of the screens, first and second forming means for simultaneously creating individual designs on the ground, operator control means for simultaneously moving and for moving the first and second forming means relative to each other in a preselected direction adjacent to under-sides of the first and second screens to define at least nearly identical designs, and optical viewing means in alignment with each of the first and second screens for stereoscopically viewing individual images resulting from the individual designs as a composite three-dimensional image.

Applicant's drawing tool is highly versatile in that the ground under each screen for having designs created thereon can take the form of: (1) a light transmitting material, such as the undersurface of each screen proper or a separate surface, such as translucent drawing paper; or, (2) an original opaque coating, such as a powderized etching composition of the type disclosed in applicant's above-referenced application. The forming means chosen for each ground would be equipped with a compatible tip for either adding (e.g., a pen or pencil) or subtracting (e.g., a scribe) drawing material from the ground.

The ground is preferably adapted to have permanent pairs of two-dimensional designs formed thereon to facilitate removal of the formed designs as a unit from the drawing tool for subsequent use and viewing, i.e., a stereogram. In addition, the first and second forming means for simultaneously defining the individual designs on the ground may comprise various types of interchangeable tips. The tips function either to add material to an at least partially empty, preexisting ground that has a different visual quality so that a design-ground visual contrast is established or to remove preexisting ground material through scribing or scraping-away to create the design by contrasting the ground's presence and absence.

Also, means can be provided in the drawing tool for interrupting lines of the designs, such as by selectively raising and/or lowering the tips. Applicant's drawing tool further contemplates the optional use of indicating means, such as a light source, for visually indicating the precise location of the tips during a drawing exercise, and also light accessing means to subject the screens and designs to full frontal lighting, full back lighting, or a combination thereof.

BRIEF DESCRIPTION OF THE DRAWINGS

Other objects and advantages of this invention will become apparent from the following description and accompanying drawings wherein:

FIGS. 1–9 are identical to those contained in applicant's U.S. patent application Ser. No. 245,306, incorporated herein by reference, illustrating a first three-dimensional drawing tool embodiment of this invention;

FIGS. 14 and 15 are sectional views illustrating alternative drawing tips for the forming means of the drawing tool;

FIG. 16 graphically illustrates a control surface for controlling the disposition of a tip of the forming means of the drawing tool during operation thereof;

FIG. 17 is an enlarged sectional view through the scribing tip of FIG. 13, and

FIG. 18 is a top plan view of a removable drawing plate adapted to be used with the drawing tool and illustrating stereograms formed thereon.

BEST MODE OF CARRYING OUT THE INVENTION

Description of FIGS. 1-9 Embodiment

Figure 1:
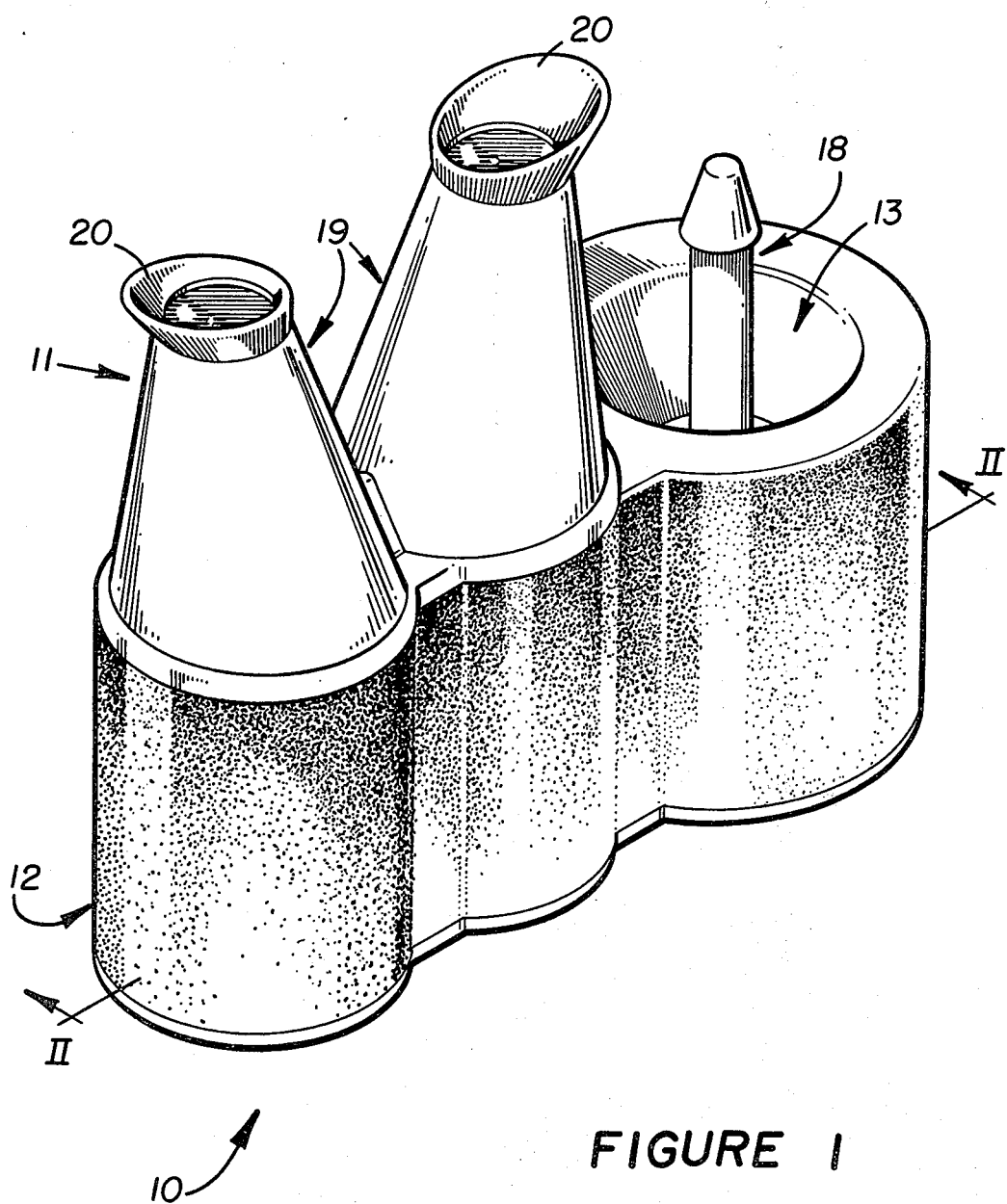
Figure 2:
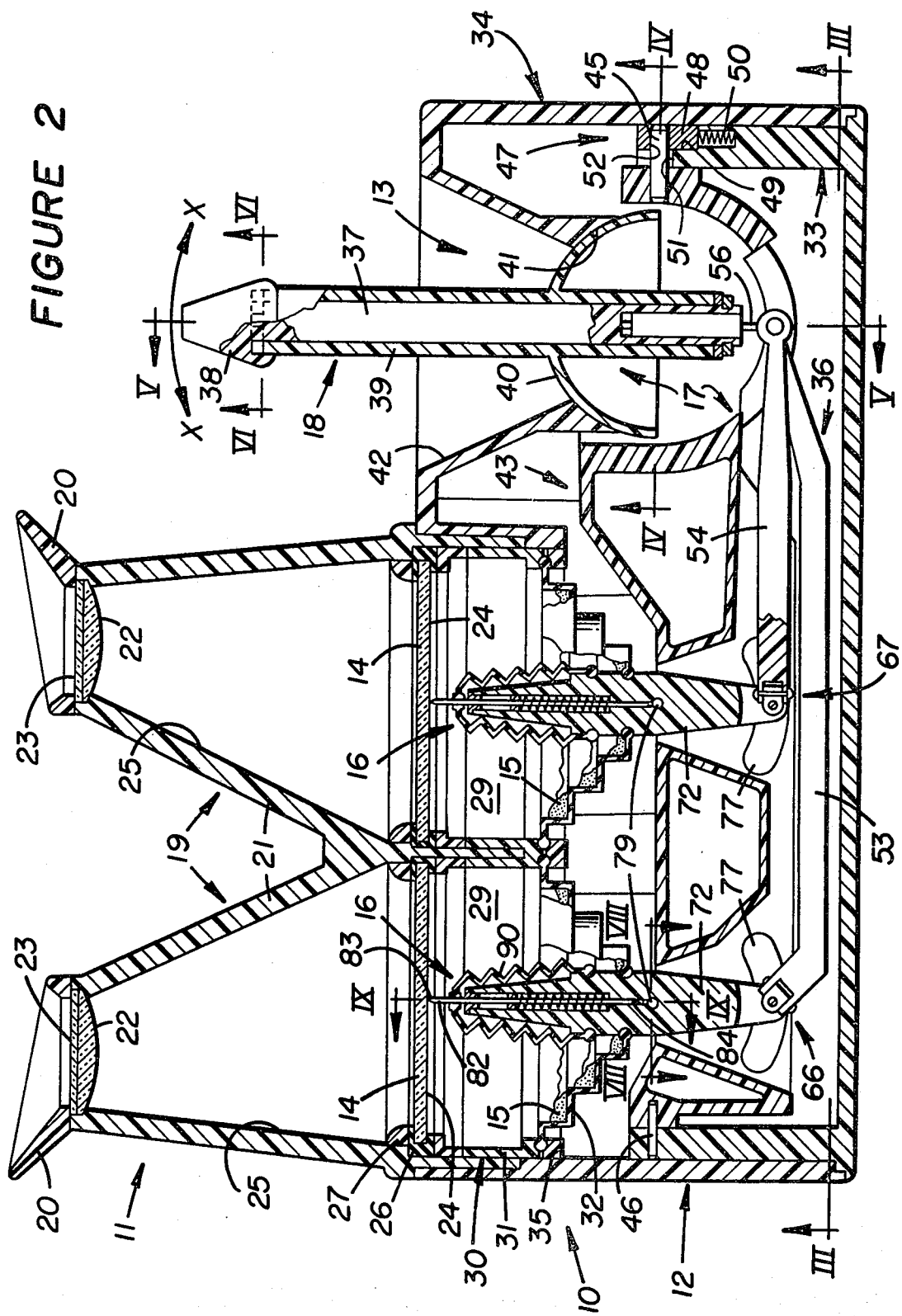

Applicant's three-dimensional drawing tool 10, illustrated in FIGS. 1-9, is described in detail in applicant's above-referenced application, the disclosure of which is incorporated herein by reference under M.P.E.P. 608.01(p). Briefly, the drawing tool includes an optical viewing module 11, a housing module 12, and a drawing module 13. Optical viewing module 11 comprises a pair of light transmitting screens 14 and a ground 15,24 is located on an underside of each screen for forming a design thereunder. In this embodiment of applicant's drawing tool, the ground preferably comprises a standard etching composition 15 composed of a powered metal, such as bronze or aluminium, adapted for adherence to underside 24 of each screen. First and second forming or scribing means 16 are adapted to simultaneously create individual designs on the ground in response to manipulation of a joy stick 18 of an operator control means 17.

An optical viewing means 19 is positioned in alignment above the screens for stereoscopically viewing the individual images, resulting from the designs formed on the screens, as a composite three-dimensional image. Reference is made to applicant's above-referenced application for a more detailed description of drawing tool embodiment 10.

Definition of Terms

The term "forming" tool or means as used herein not only includes scribing tools having tips or points that mark a line or other design on a ground by cutting, scraping, scratching, vibrational cutting or chipping, or laser cutting, but also drawing-type tips that utilize a drawing composition such as graphite, ink, paint, other types of media of art, an ink jet, or other suitable means for marking such design on a suitable ground that is compatible with the tip used.

The term "ground" or "ground means" as used herein means a surface and/or coating adapted to have a design created thereon with the use of a compatible forming means. In systems wherein material is added to the ground, the ground could comprise the underside of a transparent or translucent glass or plastic screen, transparent drawing paper, "frosting" (a light diffusing surface on a light transmitting medium, and etc.) and in systems wherein material is subtracted from the ground, the ground could comprise a powderized etching composition, ink, gel, paint, and other traditional etching grounds.

As discussed above, the forming means of this invention is adapted to create a design on a compatible ground by adding drawing material to the ground or by subtracting material from the ground to create the design by contrast of visual quality. The term "light transmitting screen" as used herein means a screen composed of a material, such as translucent to transparent glass or plastic, that will pass sufficient light therethrough for the viewing of a created design by an operator of the drawing tool.

Description of FIGS. 10-18 Embodiment

FIGS. 10, 11, 12A, and 12B illustrate a three-dimensional drawing tool 10' comprising an optical viewing module 11', a housing module 12', and a drawing module 13'. It should be noted that components and constructions illustrated in FIGS. 10-18, that function similar to those included in drawing tool embodiment 10 of FIGS. 1-9, are identified by identical numerals, but with corresponding numerals appearing in FIGS. 10-18 being accompanied by a prime symbol (').

Optical viewing module 11' comprises a removable and replaceable drawing plate or stereogram blank 94 having a pair of light transmitting screens 14' thereon. The screens have ground means 24' thereunder for having a design created under each screen in response to manipulation and movement of support means 165 for scribing tips 83'. The ground can either take the form of a diffusing composition fully coated on the undersides or imaging surfaces of the screens or non-coated and roughened light diffusing imaging surfaces. The diffusing composition can vary according to the type of designs to be made and mediums to be used. For example, the degree of adherence of the diffusing composition to the screens can vary widely, e.g., a loosely adhering mica or metal powder without any binding medium intermixed therewith, but having an electrostatic attraction to the glass screens, a similar powder, bound together with a weak binder, such as a waxy medium, or a powder strongly bound together by being intermixed with a thin acrylic suspension or other suitable suspension medium.

In addition, the particles composing the diffusing composition can vary in degree of opacity between highly transparent mica powder or flakes and aluminum powder that, in full concentration, is opaque. The diffusing composition's reflectance can also vary widely, e.g., the high reflectance of aluminum powder or white pigment to the low reflectance of lamp black. Thus, the three basic factors of adherence, reflectivity, and opacity, and their relative degrees, will largely determine the exact quality of the drawing surface or ground.

A housing module 12' mounts drawing module 13' therein and has light accessing means in the form of side panels 101 and 105 mounted thereon for reflecting and channelling light to the underside of screens 14'. Such light channelling creates a back-lit imaging condition when an opaque lens support shade 110 is placed over a lens supports 21' to eliminate frontal lighting of the screens. Closing panels 101 and 105 and removing lens support shade 110 will create a frontal lighting condition on the drawing screens.

Housing module 12' essentially comprises a body portion having drawing module 13' secured therein and optical viewing module 11' hingedly mounted thereon and adapted to be held in its closed position by a metal clip 98. Light reflecting side panels 101 and 105, each having a light reflective surface 102, of the housing module are hingedly mounted thereon and are adapted to be held in their closed positions by latches 103, 104, and 106. As more clearly shown in FIG. 12A, a metal basal dish 114 is positioned directly under each tip support means 165. The dishes are preferably formed with polished metal surfaces 115 to insure non-distortion of shape and a smooth bearing surface for a hereinafter described bearing end 119 of forming means 16'. The inner surfaces of side panels 101 and 105 are preferably coated with a standard light reflective material to reflect downwardly directed, ambient light in an upward direction to the screens when the panels are open.

Drawing module 13' comprises a pair of forming means 16' adapted to have support means 165 thereof hold various types of imaging points or tips. Each tip is capable of creating images by the use of various drawing media, such as graphite ("pencil lead") or ink or by subtraction, such as with a scribing tip adapted for scraping-away ground material. Drawing plate 94 is held so that optical viewing module 11' can be opened to change the tips without disturbing the original orientation of the drawing plate when the optical viewing module is again closed. In the opened position, the underside of the drawing plate is made directly accessible to the operator for such operations as erasing or retouching.

With different tips in place, the previously worked plate can be subjected to another form of medium, to thus provide that any given plate can be worked and reworked in various fashions and, with the exception of direct work on the opened plate, these operations can be done stereoscopically by viewing the designs in three-dimension. The drawing module further comprises interrupting means 107 for moving one or both of the drawing points relative to the surface of the screens so that interrupted lines and isolated shapes can be formed in the design being created.

In addition, a lighting arrangement or indicating means can be used in conjunction with the drawing screens, when they are at least partially translucent, to allow the drawing tips to be visible through the screens when they are in their down or non-contact position with respect to the undersides of the screens. "Cursors" or indicators are thus provided to indicate the exact location of the points and the exact location on the drawing screens whereat the points will begin to draw thereon. An optical viewing means 19' is positioned above each screen 14' for stereoscopically viewing the individual images, resulting from the above-mentioned operations, as a composite three-dimensional image.

A change in depth is brought about by operator control means 17', having a joy stick 18' adapted to orient tips 83' of first and second forming means 16' in tandem. A knob 38' of the joystick, when twisted, will change the relative distance between the two tips and hence the designs drawn on the grounds below screens 14' will not be the same. In fact the subtle differences therebetween will funtion as changes in stereoscopic depth.

It should be noted that the two cursor images (the drawing points as seen through the drawing screens) will be fused into a "single" composite image that will also vary in three-dimensional depth according to how close or far-apart they are oriented. Thus the cursor can be made to approach or receed by twisting the knob of the joy stick and the cursor will indicate not only the location of the drawing tips in a horizontal X,Y plane, but also in a Z or vertical plane, giving the operator the capability to place his next visual line exactly where it is wanted in three dimensional space as well.

Figure 12:
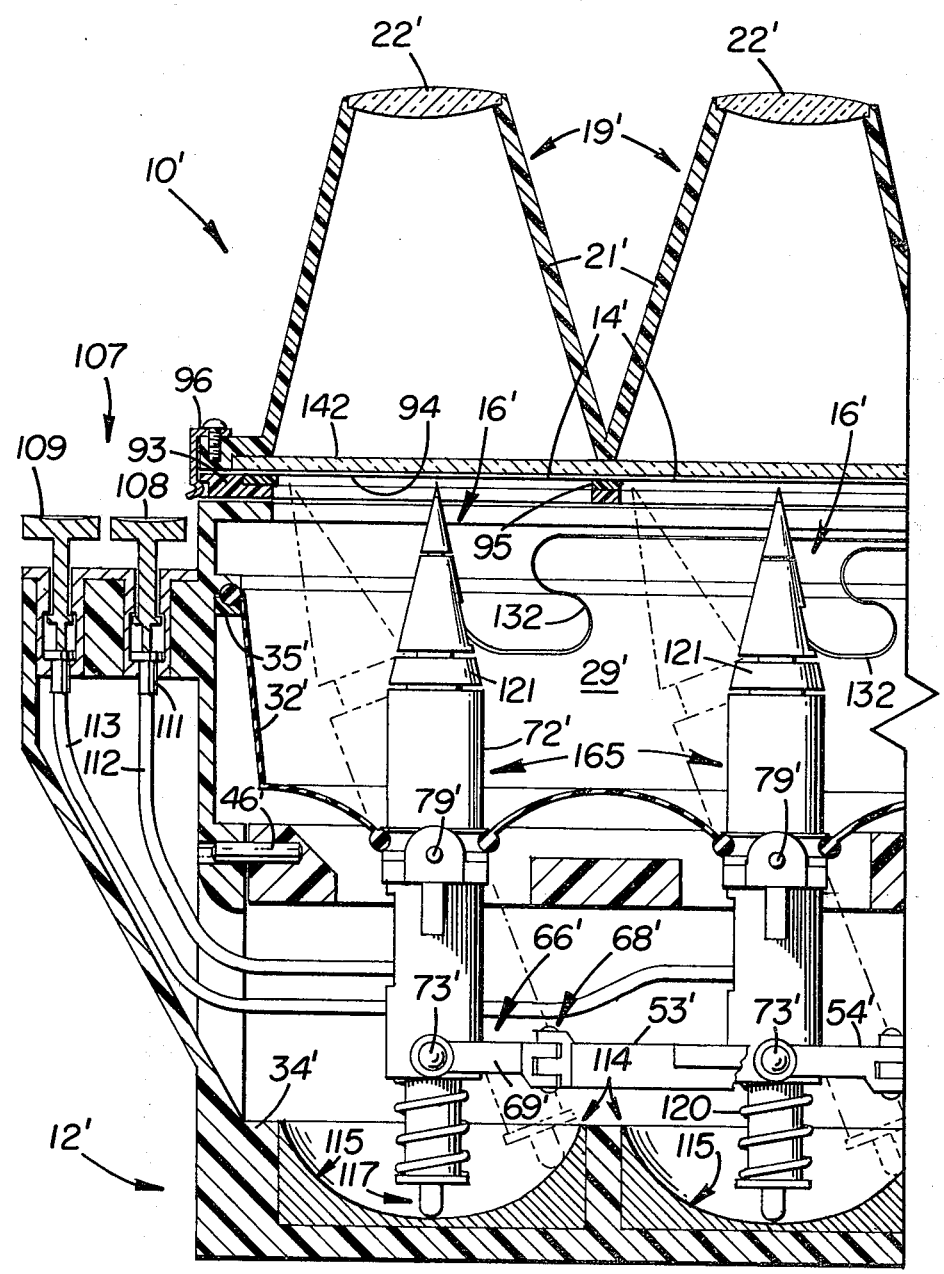
FIGS. 12A and 12B are enlarged left side and right side sectional views through the drawing tool, respectively.

As shown in FIG. 12A, optical viewing means 19' comprises a pair of transparent and tubular supports 21', securely held together by support element 30' and having convex-converging lenses 22' secured on the upper ends thereof. The inner surfaces of the supports are preferably roughened to diffuse incoming ambient light. A single transparent glass plate 142 is preferably secured in sealing relationship in viewing means 19' to form a pair of dust-free optical chambers that function to continuously provide non-distorted fields of vision through the viewing means. It should be noted that in the FIGS. 1-9 embodiment, that the ground means for defining a ground thereon comprised transparent glass screens 14 themselves and drawing medium 15. In the FIGS. 10-18 embodiment, the ground is defined on a separate and removable plate 94.

Various types of drawing plates 94, having frames 95, can be secured in flush relationship on the underside of glass plate 142, by means of an adapting frame 93. The adapting frame is hinged at 100 to optical viewing means 19' and is held in place by standard metal clips 96, adapted to engage recesses 97. The entire optical viewing module is connected to housing module 12' by a pair of hinges 99 and secured in place by clip 98.

As suggested above, the optical viewing module may include a separate opaque lens support shade 110 adapted to fit snugly over viewing means 19' to eliminate frontal lighting of the drawing screens when the tool is in its back-lighting mode of illumination, i.e., when the screens are illuminated from underneath. Each lens 22' is preferably shaped to focus in as flat a plane as possible, consistent with overall image quality on the drawing surface or ground defined on each screen 14'. Drawing tool embodiment 10' may be constructed, for example, to have the median three-dimensional distance appear to be three feet from the viewer's eyes.

Hence, the eyes converge by 2° each and the lenses are tilted by a like amount to provide them with optimum effective focus by presenting them perpendicular to the eyes when the eyes are viewing the middle of the drawing field at the median depth. The lenses have a longer standard focal length than the distance at which they are set in the screen, but they are set at the particular distance such that an operator's eyes will accommodate to focus equivalent to looking at an object three feet away. In this application, the focus of the eyes and their convergance point will normally coincide to the natural situation. Stereoscopic principles pertaining to drawing tool 10' are essentially the same as those pertaining to drawing tool 10 (FIGS. 1-9).

A thin elastic rubber seal 32' will form a closed chamber 29' when the optical viewing module is closed and secured in place. The seal is preferably formed of a translucent rubber material so that it will become a diffusing light source for the bottom of the screens. The main axles and connecting rods of drawing module 13' are also preferably made of a clear transparent plastic material, such as styrene, so that they do not impede the ingress of light into the optical viewing module nor will they cause unwanted shadows therein. Seal 32' also functions to retain the ground material, when in the form of a powder, from spreading-about in the drawing tool.

Drawing module 13' functions basically the same as drawing module 13, but adds additional functions necessitating modified constructions and added elements. Drawing module 13' also functions to move drawing tips 83' in tandem in response to manipulation of joy stick 18' of operator control means 17'. Selective rotation of knob 38' will function to change the relative distance between the tips in generally the same manner as described in applicant's previous application. The linkage means is functionally the same as linkage means 16, but is composed of a clear plastic material to facilitate back-lighting of the screens from ambient light reflected upwardly into the drawing tool when panels 101, 105 are opened.

Connecting rods 53', 54' have been modified at their connection to forming means 16' so that the forming means are enabled to accomplish additional functions, not performed by forming means 16 of FIGS. 1-9. In particular, each forming means 16' is adapted to utilize various types of drawing tips 83', is adapted to selectively raise or lower the tips and maintain the tips closely adjacent to and slightly below the underside of the drawing screens in a horizontal plane, regardless of the pivotal orientation of the forming means, and provides a cursor, indicating the precise location of the tips to the operator. As described more fully hereinafter, a light source 144 (FIG. 12B) is adapted to illuminate each tip for viewing by the operator.

Figure 13:
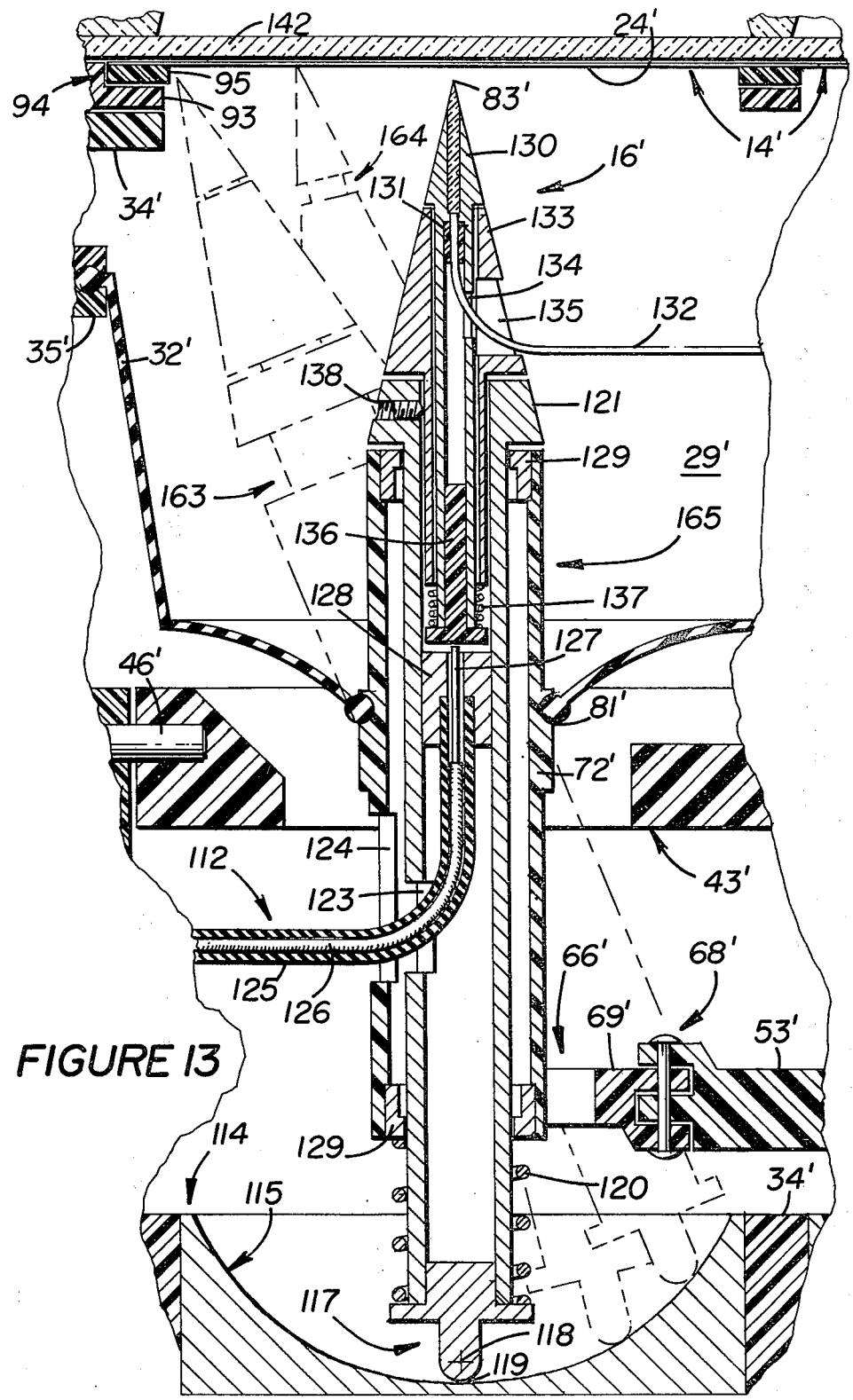
FIG. 13 is an enlarged sectional view through a forming means, including a scribing tip, and attendant components employed in the drawing tool.

FIG. 13 more clearly illustrates forming means 16' and tip support means 165 thereof. The support means includes a tubular outer member 72', rotatably mounted on a tube 121 and adapted to be pivoted on a pair of axle pins 79' (FIG. 12A) connected to a horizontally disposed axle 43'. Member 72' is further attached to connecting rod 53' of the linkage means, via a forked hinge element 69' pivotally attached to the member by a pair of pins 73'. A pin 68' interconnects element 69' and connecting rod 53'.

As further shown in FIG. 13, tip 83' is secured in a holder 130 reciprocally mounted in a housing 133. In turn, housing 133 is reciprocally mounted in tube 121 with the tube being reciprocally mounted in member 72' by annular slide bearings 129. A set screw 138 releasably secures housing 133 in tube 121 to facilitate replacement thereof, as hereinafter more fully described. Tube 121 has its lower end capped by a plug or foot 117 with the foot terminating at its lower end at semi-spherical bearing end 119. The bearing end is urged into continuous bearing engagement with curved surface 115 of dish 114 by the inherent weight of tube 121 and a compression coil spring 120, mounted between a flange of the foot and lower bearing 129, secured on the lower end of tube 121.

The curvature of surface 115 is computed so that tube 121 and drawing tip 83' are urged upwardly to maintain the tip in close proximity to the underside of drawings screen 14' and at least approximately parallel thereto in a horizontally disposed plane thereunder, as depicted by the movement of scribing means 16' in FIG. 13 between its solid line and phantom line position 163. Surface 115 is cup-shaped to thus provide such desiderata in the horizontal or X,Y plane. FIG. 16 graphically depicts movement of the drawing tip with the compound curve defining surface 115 being derived from the following formulas:

$$X = X' - \left[ \frac{LX'}{\sqrt{F^2 + X^2}} \right]$$

$$Y = \left[ \sqrt{L^2 - (X - X')} \right]^2$$

wherein:
L = |l₁ + l₂| = Distance between the point of tip 83' and a center of radius 118 for semi-spherical bearing surface 119, and
R = The radius of bearing surface 119.

It should be noted that slight modification is required to compensate for the radius R of bearing surface 119. Expansion of the mathematical value of the compound curve, defining surface 115, is achieved by adding the value of the radius R, perpendicular to the tangent to the curve at any given point. This expands the curve to an actual value for surface 115 that is adapted to a particular foot 117 having a given radius R at its bearing surface 119.

Figure 12B:
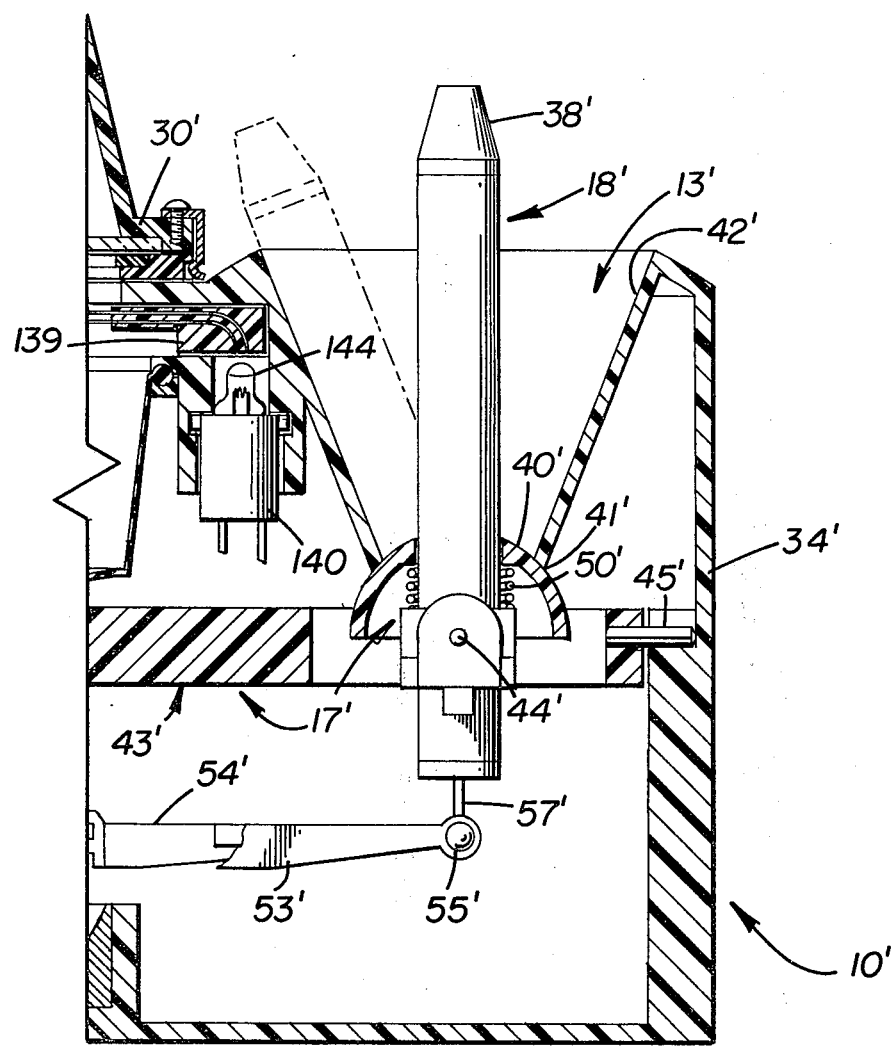

As discussed above, since each tip 83' is continuously held closely adjacent to an underside of a respective drawing screen 14', the tip is enabled to further function as a cursor. As shown in FIGS. 12A, 12B and 13, the cursor function is provided by light source or bulb 144, the light of which is transmitted to the drawing tip via a fiber optic strand 132. The bulb is held in a removable socket 140, held in place by a standard bayonet connection.

A drawing exercise is commenced by pressing-down on keys 108,109 (FIG. 12A), coupled to shielded cables 112, 113 for the respective drawing tips. As shown in FIG. 13, cable 112, for example, is secured in place by a collet 111 and projects through slots 123 and 124, formed through tube 121 and member 72', respectively, and extends upwardly and has an outer shield 125 secured within a cable block 128, secured within the tube. A sheath 126 of cable 112 has flexible rod 127 reciprocally mounted therein and adapted to have its exposed end move upwardly in FIG. 13 when button 108 is depressed.

Such upward movement of rod 127 engages a plug 136, secured within a tubular portion of housing 130, to overcome the downward and opposite biasing force of a compression coil spring 137, positioned between a lower end of housing 133 and the plug. Housing 130 and tip 83' are thus forced upwardly, as shown by phantom-line position 164 in FIG. 13, to contact the drawing surface or ground with the drawing tip.

FIG. 13 illustrates an exaggerated distance between tip 83' and the underside of screen 14' for the sake of clarity and understanding, i.e., in actual practice such distance would be in the range of 0.5 mm. Since the illuminated tip of forming means 16' constitutes the only visible cursor, (assuming proper translucent drawing screens and appropriate lighting conditions), the operator is enabled to precisely locate the tip to accurately create his design on the screens. Conversely, if the internal components of the drawing tool were visible to the operator through the screens, he could become confused and inaccuracies in the drawing could ensue.

Illuminated tip 83' is normally used in conjunction with frontal lighting of the screens and is particularly useful when the ground material on the underside of the screen is nearly opaque, e.g., translucent drawing paper. The tip can be formed as a cylindrical rod, having its upper end tapered to form a scribing point, and composed of a hard crystal, gem, plastic, or glass composition, honed to a fine sharpness. Fiber optic strand 132 extends through slots 134, 135 and is held in place by a plug 131 to abut the base of the tip to transmit illumination therethrough.

The point can be press-fitted into housing 130 and the outer surfaces of the housing preferably has an aluminized or like coating 157 (FIG. 17) formed thereon. Such aluminizing aids in further channeling light and restricts its emittance to an intensely small and bright light at the point of tip 83'. Should the operator choose to substitute a different type of drawing tip (e.g., ink) the same can be readily accomplished by releasing set screw 138 (FIG. 13) and either removing a fiber optic jack 139 and strands 132, or permitting them to remain in the drawing tool.

FIG. 14 illustrates an alternative drawing tip 146 at the end of a cartridge 147, mounted in a tubular holder 130'. The holder is slidably mounted in a housing 133' and is adapted to be raised and lowered therein by cable release rod 127 (FIG. 13) in the manner described above. A compression coil spring 150 exerts an upward pressure on ink 148, between a rubber piston 149 and a plug 151, in order to maintain proper ink flow against the force of gravity.

The tip thus forms part of an ink cartridge assembly 159 that can be replaced by an other type of inking device so long as an upward writing force is applied to ground 24' on screen 14' and means are provided for applying an upward force on the ink to ensure ink flow to the tip thereof. Also, nylon tipped pins, depending on capillary flow, would not normally require means equivalent to spring 150 and piston 149 for exerting an upward force on the ink. It should be apparent that various types of ink cartridges, having different colored inks, could be periodically substituted for each other to provide a full color, three-dimensional image, if so desired.

FIG. 15 illustrates a drawing tip 152 mounted in a pencil cartridge assembly 160. A holder 130'', mounted in a housing 133'' has an internally threaded cap 154 threadably mounted on a slotted end 155 of the holder to adjust the pencil lead (graphite) therein and through a tapered end 153 of housing 133'' in a conventional manner. As the pencil lead becomes expended, it can be suitable extended by releasing cap 154, extending the lead, and retightening the cap.

FIG. 18 illustrates screens 14' each having a simple drawing of a circle and a triangle formed thereon. It should be noted that the two triangles are further apart than the two circles and, when viewed in a stereo-viewer, would appear as a single three-dimensional composite view and would be seen and appear as if the triangles were further away from each other than the circles. If an operator of the machine, during a drawing exercise, wanted the circle on the left hand screen in FIG. 18 to be solid (absence of dotted line 158 completing the triangle) he is enabled through the use of push button 108 or 109, to discontinue this portion of the triangle on the appropriate half of the stereogram.

Contradictions of this type can occur during stereoscopic viewing exercises so that applicant's drawing tool's ability to discontinue and recontinue lines provides for the creation of believable three-dimensional spaces.

Figure 6:
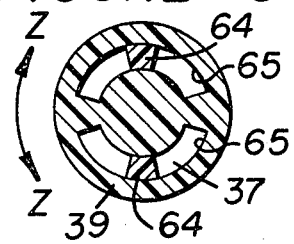
Figure 7:
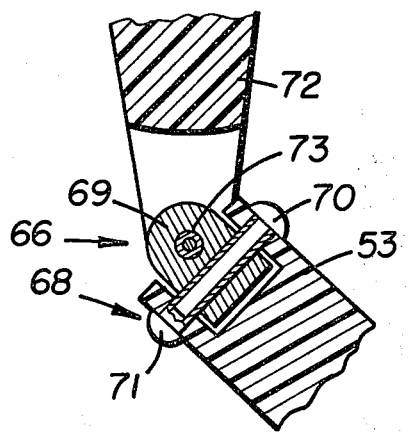
Figure 8:
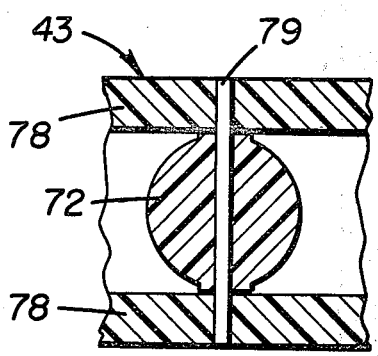
Figure 5:
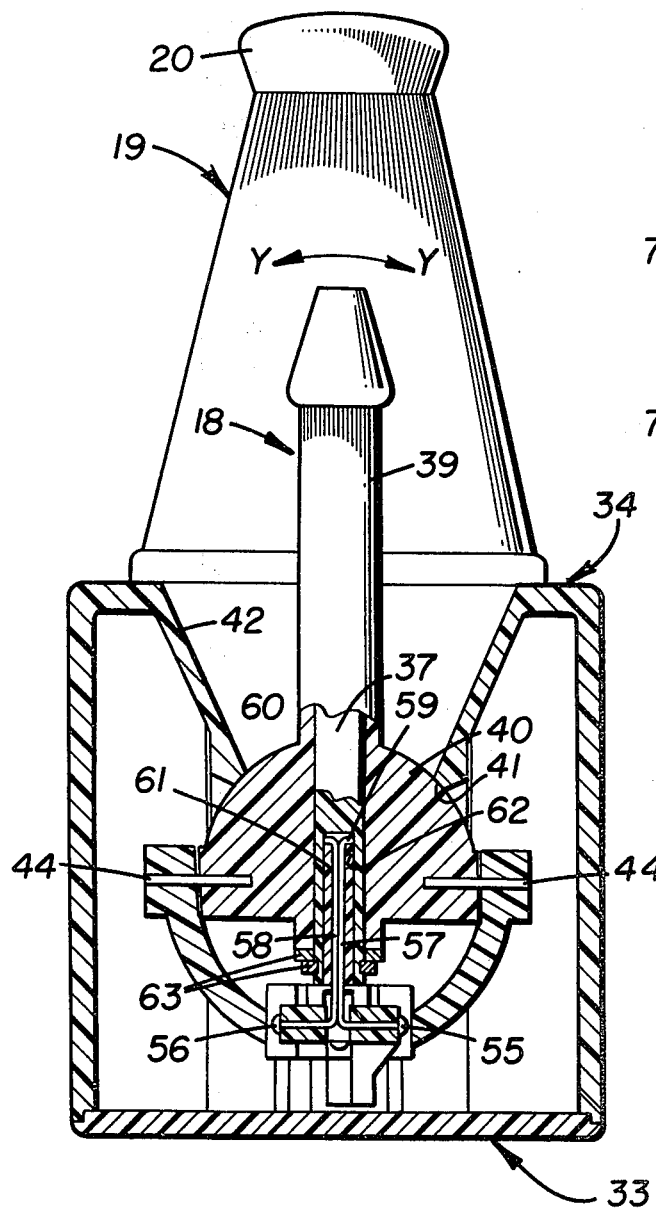
Figure 9:
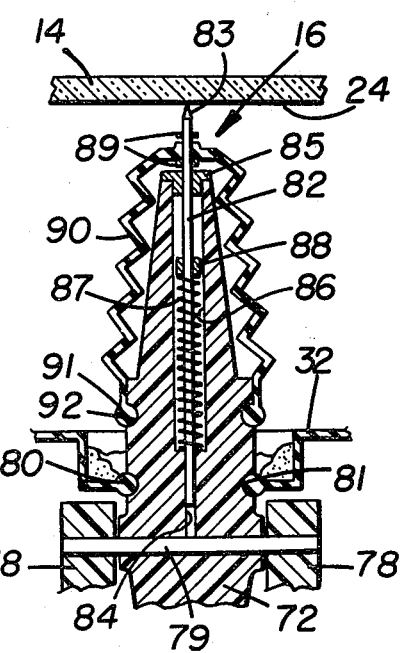
Figure 10:
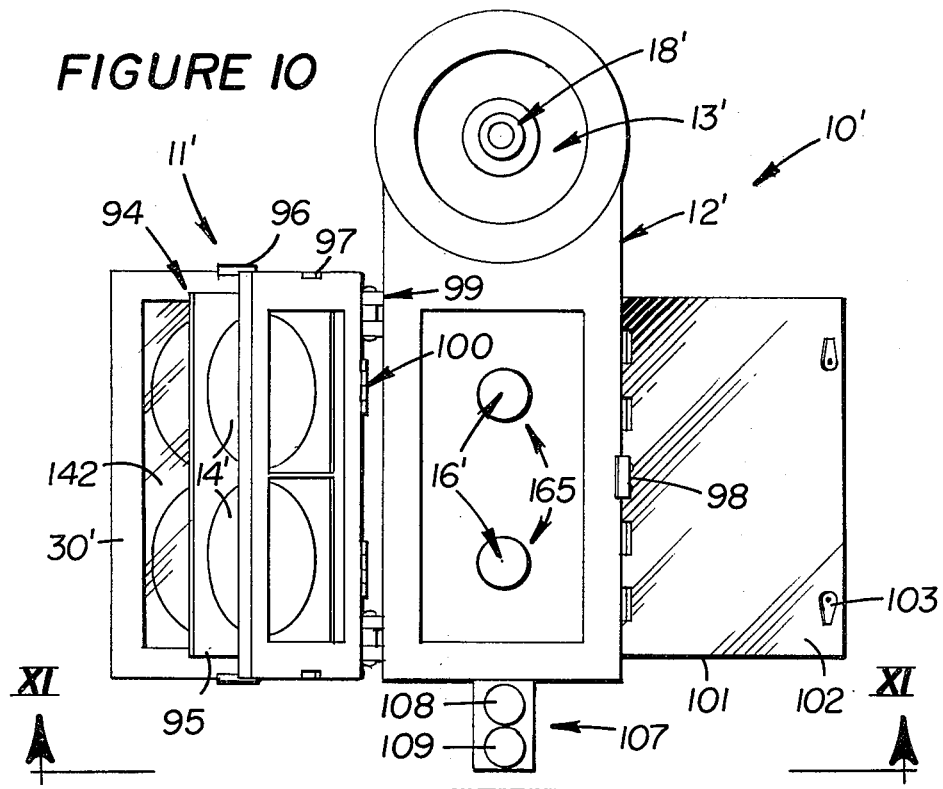
FIG. 10 is a top plan view of a second drawing tool embodiment of applicant's invention, as described in detail herein.
Figure 11:
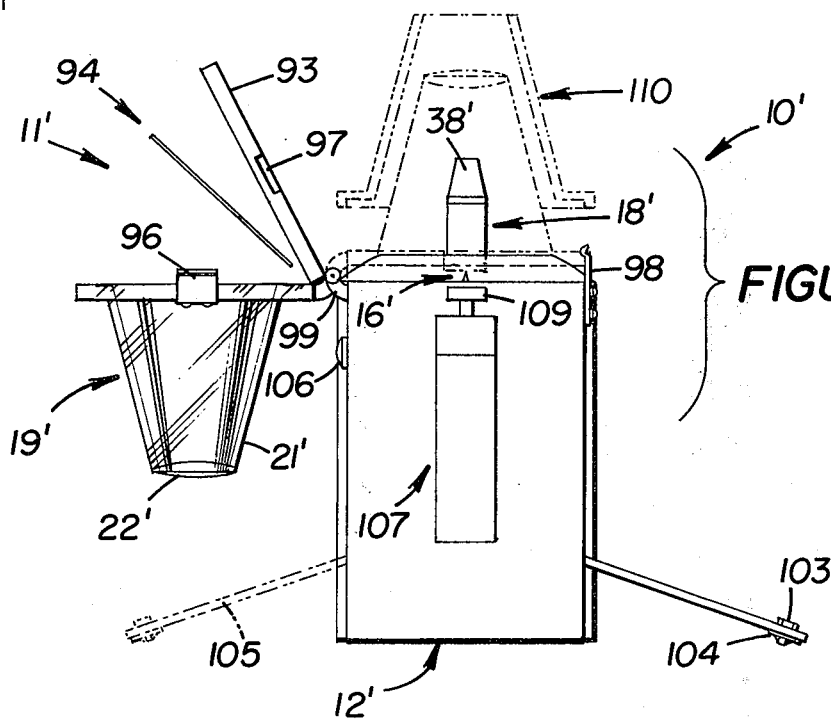
FIG. 11 is a side elevational view of the drawing tool, taken in the direction of arrows XI—XI in FIG. 10.

In a prototype of applicant's drawing tool, angular movement of joy stick 18' was effected in both the X-X and Y-Y directions of approximately 46°, as dictated by a frusto-conically shaped recess 43' (FIG. 12B). Tips 83' exhibited a greater degree of movement in the X-X direction, in comparison to the Y-Y direction, due to the relative distance changes accorded to them by means of selective rotation of shaft 37 (FIG. 2) in the Z-Z direction (FIG. 6). Assuming that joy stick 18' is disposed vertically in its mid-position, as shown in FIG. 12B, rotation of knob 38' in direction Z-Z and through an arc of 60° will function to tilt each drawing tip 1.5° from its vertical disposition so that it will tip-over to a maximum total of 23°. Thus, the maximum horizontal angular distance is increased to a total of 46°, as opposed to the joy stick's total movement of 43°. The movements of the joy stick and drawing points in direction Y-Y, however, will remain the same, e.g., 43° total angular movement.

I claim:

1. A three-dimensional drawing tool comprising:
   a housing,
   first and second light transmitting screens mounted on said housing,
   ground means for defining a ground beneath each screen,
   first and second forming means compatible with said ground means for simultaneously creating individual designs on said ground by at least one of adding on and subtracting composition material from said ground,
   operator control means for simultaneously moving and for moving said first and second forming means relative to each other in a preselected direction adjacent to undersides of said first and second screens to define said individual and at least nearly identical designs on said ground, and
   optical viewing means in alignment with each of said first and second screens for stereoscopically viewing individual images resulting from said individual designs as a composite three-dimensional image, said ground being positioned between said optical viewing means and said forming means.
2. The drawing tool of claim 1 wherein said first and second screens are each on a plate removably mounted in said housing.
3. The drawing tool of claim 1 wherein said ground comprises a lower surface of each of said screens.
4. The drawing tool of claim 1 wherein said ground comprises an opaque etching ground beneath each of said first and second screens and each of said first and second forming means comprises a scriber.
5. The drawing tool of claim 4 wherein said coating is selected from a group consisting of a powderized etching composition, ink, gel and paint.
6. The drawing tool of claim 1 wherein said ground is composed of a light transmitting material and each of said first and second forming means comprises means for applying an at least substantially opaque drawing composition on said ground material.
7. The drawing tool of claim 6 wherein said drawing composition is selected from a group consisting of ink, graphite, or paint.
8. The drawing tool of claim 6 wherein said drawing composition is selected from a group consisting of ink, graphite, or paint.
9. The drawing tool of claim 1 further comprising means for selectively and individually engaging and disengaging each of said first and second forming means from said ground whereby creation of said designs can be interrupted.
10. The drawing tool of claim 1 further comprising indicating means for illuminating each of said first and second forming means to visually indicate to an operator the precise location thereof.
11. The drawing tool of claim 1 further comprising light accessing means for creating full frontal lighting beneath said screens, full back lighting beneath said screens, or a combination of full frontal and full back lighting beneath said screens.
12. The drawing tool of claim 1 further comprising means for maintaining each of said first and second forming means at least approximately parallel to a respective one of said screens upon movement of said first and second forming means by said operator control means.

* * * * *